H. BONBRIGHT.
ELECTRIC SPEEDOMETER AND ODOMETER.
APPLICATION FILED JULY 24, 1908.
910,898.
Patented Jan. 26, 1909.
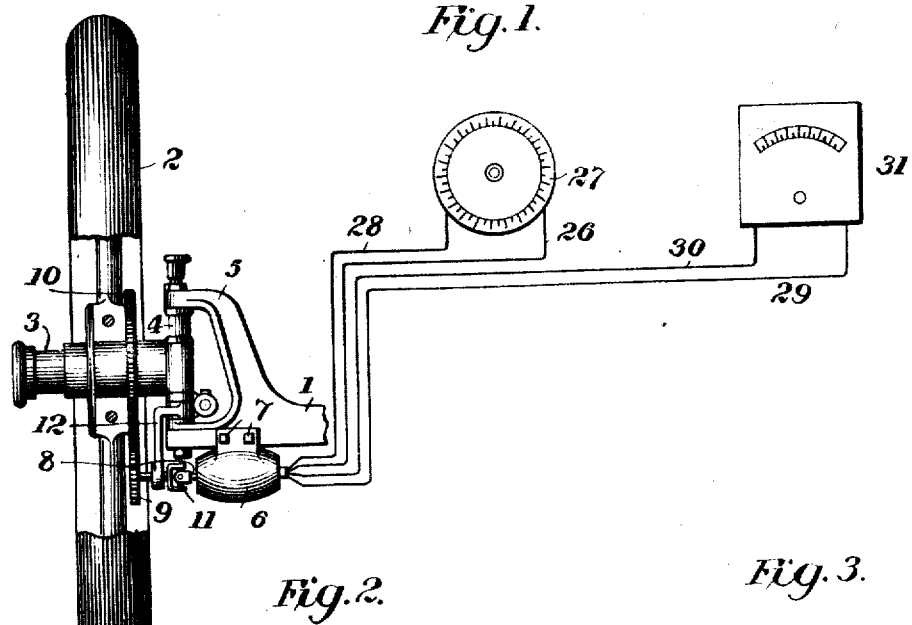
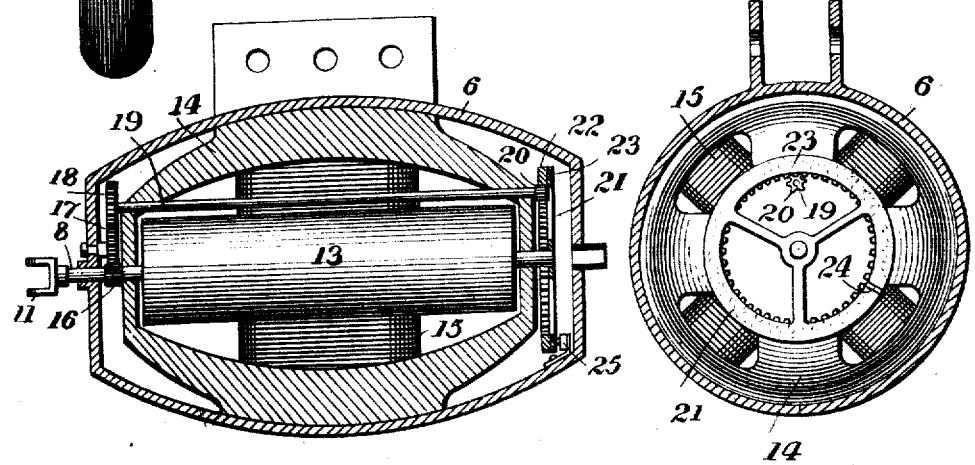
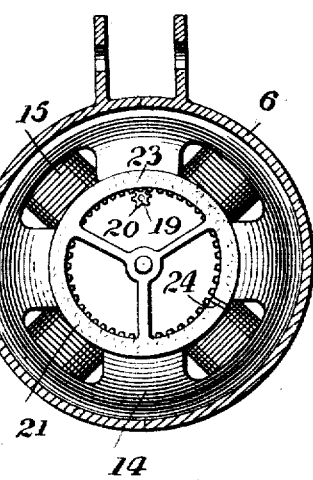
Witnesses
Inventor
Howard Bonbright
By
Foster, Freeman, Watson & Coit
Attorneys

UNITED STATES PATENT OFFICE.

HOWARD BONFRIGHT, OF NEW HAVEN, CONNECTICUT.

ELECTRIC SPEEDOMETER AND ODOMETER.

No. 910,898.　　　Specification of Letters Patent.　　　Patented Jan. 26, 1909.

Application filed July 24, 1908. Serial No. 445,179.

*To all whom it may concern:*

Be it known that I, HOWARD BONFRIGHT, a citizen of the United States, and residing at New Haven, in the county of New Haven and State of Connecticut, have invented certain new and useful Improvements in Electric Speedometers and Odometers, of which the following is a specification.

This invention relates to means for determining and indicating the speed of travel and the distance traveled by a vehicle mounted on wheels, and it is particularly adapted for use on motor vehicles. Its objects are to provide simple and compact mechanism which may be easily applied to the vehicle, and which mechanism will accurately indicate both the speed of travel and the distance traveled.

The invention embodies a dynamo mounted on the vehicle and driven from the wheel of the vehicle, whereby the speed of the dynamo is controlled by the speed of the vehicle, and there are two circuits leading from this dynamo in one of which is placed an odometer and in the other of which is placed a speedometer.

The novel features of the device will be apparent from the following description taken in connection with the accompanying drawings.

In the drawings,—Figure 1 is a view partly diagrammatic, showing my invention applied to the front axle of a motor vehicle; Fig. 2 is a longitudinal section through the dynamo which I use showing the mechanism used for controlling the current which supplies the odometer; and Fig. 3 is an end view of the dynamo having the casing thereof in section.

In these drawings, 1 represents the front axle of a motor vehicle, and 2 represents one of the front wheels mounted on a wheel axle 3, which is pivotally secured to the front axle 1 by the knuckle joint 4 in the usual manner.

Mounted on the front axle as near the forked end 5 as it can be conveniently placed is a dynamo casing 6 which is preferably made in the form shown. This casing is secured to the axle by bolts 7, and carries within it the operative parts of the dynamo and the make and break mechanism for the odometer circuit. The shaft 8 of the armature extends through an opening in the end of the casing, and this shaft is driven from gear 9 meshing with gear 10 on the hub of the front wheel. Since the front wheel is adapted to turn at an angle to the front axle 1 it is necessary to have flexible connection between the shaft 8 and the gear wheel 9, and it will be clear that any suitable form of flexible connection may be used. In the form shown I have used the universal joint 11, and have supported the shaft of the gear 9 by means of the bent arm 12 which is secured by suitable means to the knuckle joint 4, so that it will turn with that joint and will carry the gear 9 always in the same relation to the gear 10. By this means the armature of the dynamo is driven by the front wheel in whatever position that wheel may be at the time.

Referring to Fig. 2 the armature of the dynamo is marked 13, and the casing is marked 14, and it carries the field windings 15. The shaft 8 extends entirely through the armature and has on its front end within the casing 6 a pinion 16 meshing with gear wheel 17 driving the pinion 18 on the shaft 19 which extends longitudinally of the dynamo parallel with the armature shaft. This shaft 19 has at its outer end a pinion 20 which meshes with the internal gear teeth on the large wheel 21 which is mounted on the shaft of the armature and adapted to rotate thereon. This wheel 21 has a metal portion 22 which is adapted to be electrically connected with one of the wires leading from the dynamo and also has the non-conducting face 23 which may be made of fiber. A narrow strip 24 of the metal portion 22 extends through the fiber face at one point as clearly shown in Fig. 3. A brush 25 is mounted within the casing 6 bearing on the fiber face of the wheel 21, and this brush is connected to one of the wires 26 leading to the odometer 27. The return wire 28 is connected directly to the dynamo. A second circuit made up of wires 29, 30 leads to the speedometer 31, and it will be understood that this circuit is continuously operated so that whenever the dynamo is driven by the rotation of the vehicle wheel current will pass through the speedometer. It will be understood that the amount of current generated by the dynamo is in direct proportion to the speed of travel of the vehicle, and it will also be understood that the speedometer is so constructed and the dial so marked that it will indicate the rate of travel in miles in accordance with the amount of current which is passing through it.

The odometer is operated by the make and break of the current effected by the wheel 21 and brush 25. The gearing which connects this wheel 21 with the shaft 8 is so proportioned that the contact piece 24 will make one complete revolution and complete the circuit through the brush 25 once in every one-tenth of a mile traveled by the front wheel 2, and by this completion of the circuit the indicator on the odometer is moved forward one point, each point on the dial being marked one-tenth of a mile. It will be understood that any other marking and any other proportion between the speed of the shaft 8 and the wheel 21 may be used so long as there is a proper correspondence between the marking on the dial and the speed of travel.

The casing 6 may be made practically airtight so as to exclude water and moisture from the working parts of the apparatus, and since all of the working parts are within this casing and nothing extends outside of it, except the driving shaft and the circuit wires, very effectual protection is provided for the apparatus and the chance for accidental derangement is reduced to a minimum.

It will of course be understood that any desired number of indicating dials may be placed in the circuits at proper places in the vehicle for observation by the occupant.

Having thus described the invention, what is claimed is:

1. The combination with a rotary shaft, of a dynamo electric machine geared to be operated thereby, an odometer, a circuit connecting said odometer with said dynamo electric machine, means operated by said machine for making and breaking the circuit to operate the odometer, a speedometer and a continuous circuit connecting the said speedometer to said dynamo electric machine.

2. The combination with the front axle of a motor vehicle, of a dynamo electric machine carried thereby, means for operating said dynamo from the front wheel, a speedometer and an odometer, circuits connecting said speedometer and odometer with said dynamo, and means operated by said dynamo for making and breaking the odometer circuit.

3. The combination with a vehicle mounted on wheels, of a dynamo carried thereby, means for operating said dynamo by the rotation of a wheel of the vehicle, a speedometer, a continuous circuit connecting said dynamo with said speedometer, an odometer, a circuit connecting said odometer and dynamo, a rotary non-conducting disk in said last mentioned circuit having a conducting point connected in circuit extending therethrough, a brush in circuit making contact with said disk and passing over said point, and gearing connected with said dynamo for turning said disk.

4. In a device of the class described, the combination with a dynamo, of an odometer, a circuit connecting said dynamo and odometer, a rotary disk having a conducting back connected in circuit and a non-conducting face, and having a conducting piece extending from the back through the face at one point, a brush in circuit bearing upon said face, and gearing connecting the shaft of said dynamo with said disk to rotate it.

5. The combination with the front axle of a motor vehicle, of the front wheels pivotally secured to said axle by knuckle joints carrying the wheel axles, a dynamo secured to the front axle adjacent said knuckle joint, a speedometer and an odometer connected to and operated by said dynamo, a gear on the wheel hub, an intermeshing gear carried by a bracket secured to and moving with the knuckle joint and a flexible shaft leading from said last mentioned shaft to the shaft of the dynamo armature.

6. In a device of the class described, the combination with the field windings and the armature of a dynamo, of a casing surrounding said parts, a rotary shaft within the casing parallel with the armature shaft, gearing at one end of the armature connecting said rotary shaft with the shaft of the armature, a rotary disk mounted on the shaft of the armature at the other end, gearing connection between said disk and rotary shaft, an odometer connected in a circuit leading from said dynamo, a contact brush in said circuit bearing on said rotary disk, the said disk being connected in circuit, but provided with means on its face for making and breaking the circuit through said brush.

7. The combination with a motor vehicle, of a dynamo carried thereby, means for operating said dynamo from the vehicle wheel, a tight casing for said dynamo, a speedometer and an odometer and circuits leading to each from said dynamo, and means within said casing operated by the rotation of the armature shaft for making and breaking the circuit to the odometer.

In testimony whereof I affix my signature in presence of two witnesses.

HOWARD BONBRIGHT.

Witnesses:
J. P. CAREY,
RALPH S. YOUNG.